Figure 1:
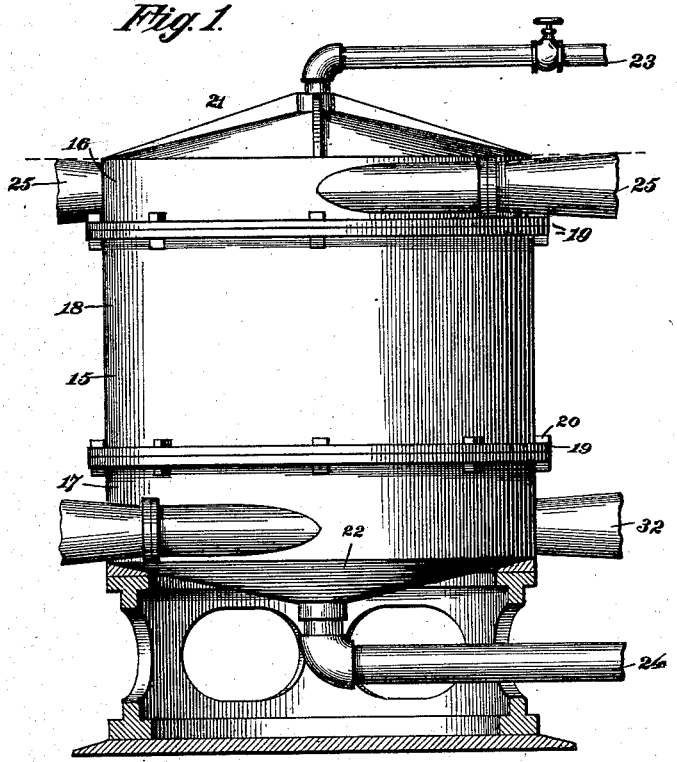

No. 714,793. Patented Dec. 2, 1902.
L. GATHMANN.
WATER PURIFYING APPARATUS.
(Application filed Mar. 7, 1901.)

(No Model.) 7 Sheets—Sheet 1.

Witnesses
H. S. Austin

Louis Gathmann Inventor
By Offield Towle Linthicum
Attorneys

No. 714,793. Patented Dec. 2, 1902.
L. GATHMANN.
WATER PURIFYING APPARATUS.
(Application filed Mar. 7, 1901.)
(No Model.) 7 Sheets—Sheet 2.
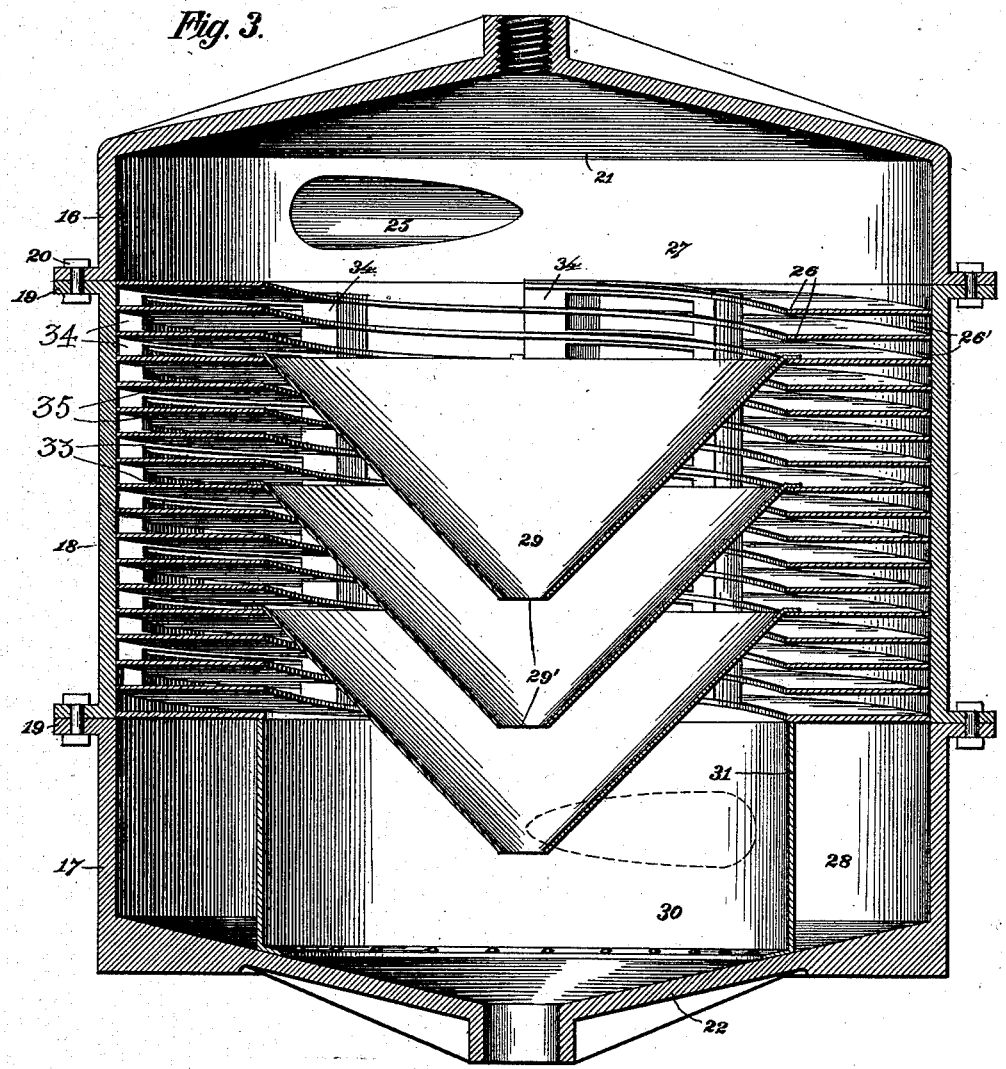
Fig. 3.
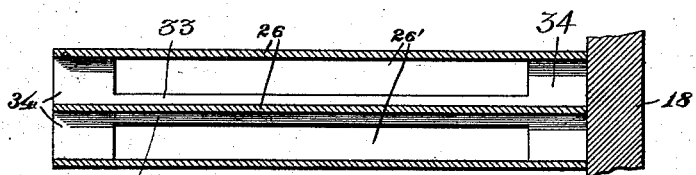
Fig. 3.ª
Witnesses
Inventor
Louis Gathmann
Attorneys No. 714,793. Patented Dec. 2, 1902.
L. GATHMANN.
WATER PURIFYING APPARATUS.
(Application filed Mar. 7, 1901.)
(No Model.) 7 Sheets—Sheet 3.
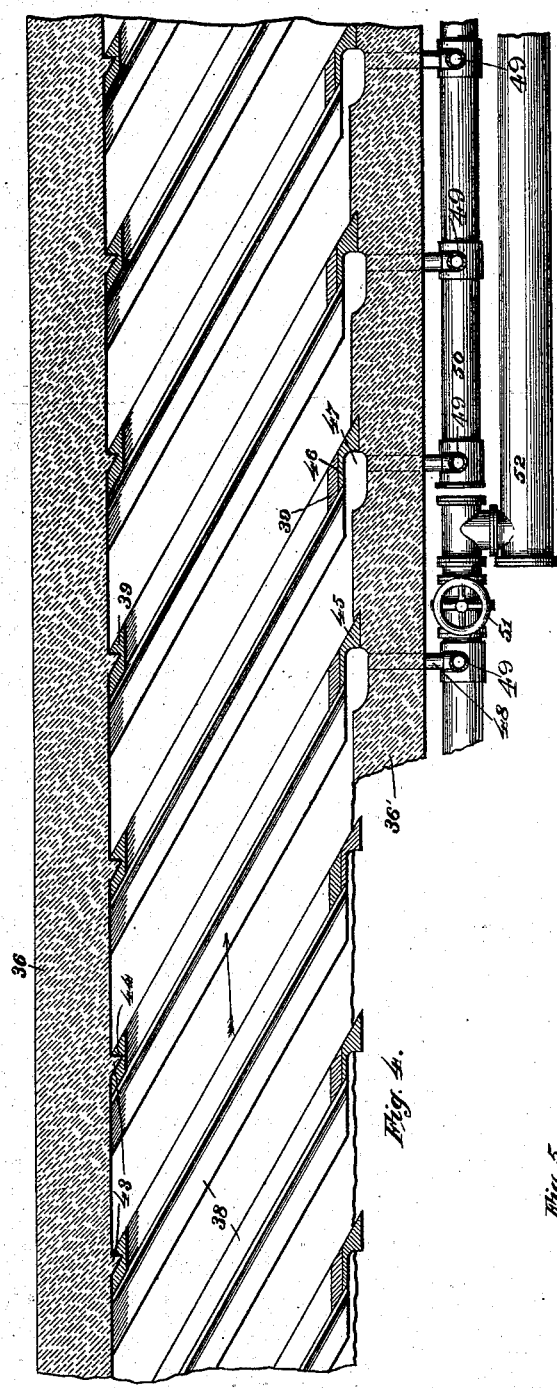
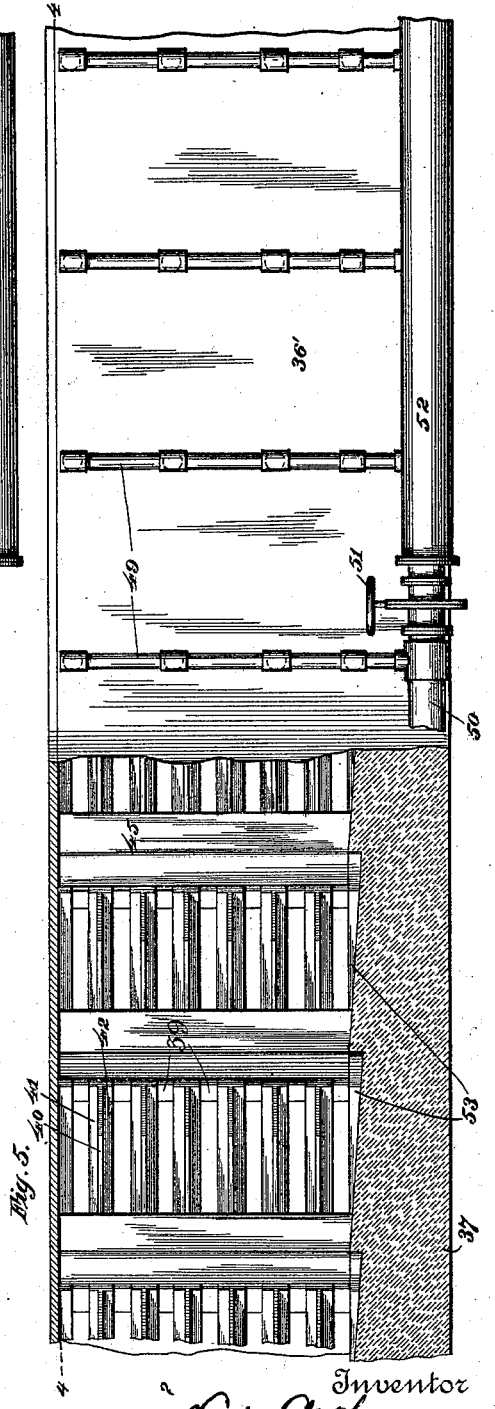

No. 714,793. Patented Dec. 2, 1902.
L. GATHMANN.
WATER PURIFYING APPARATUS.
(Application filed Mar. 7, 1901.)
(No Model.) 7 Sheets—Sheet 4.
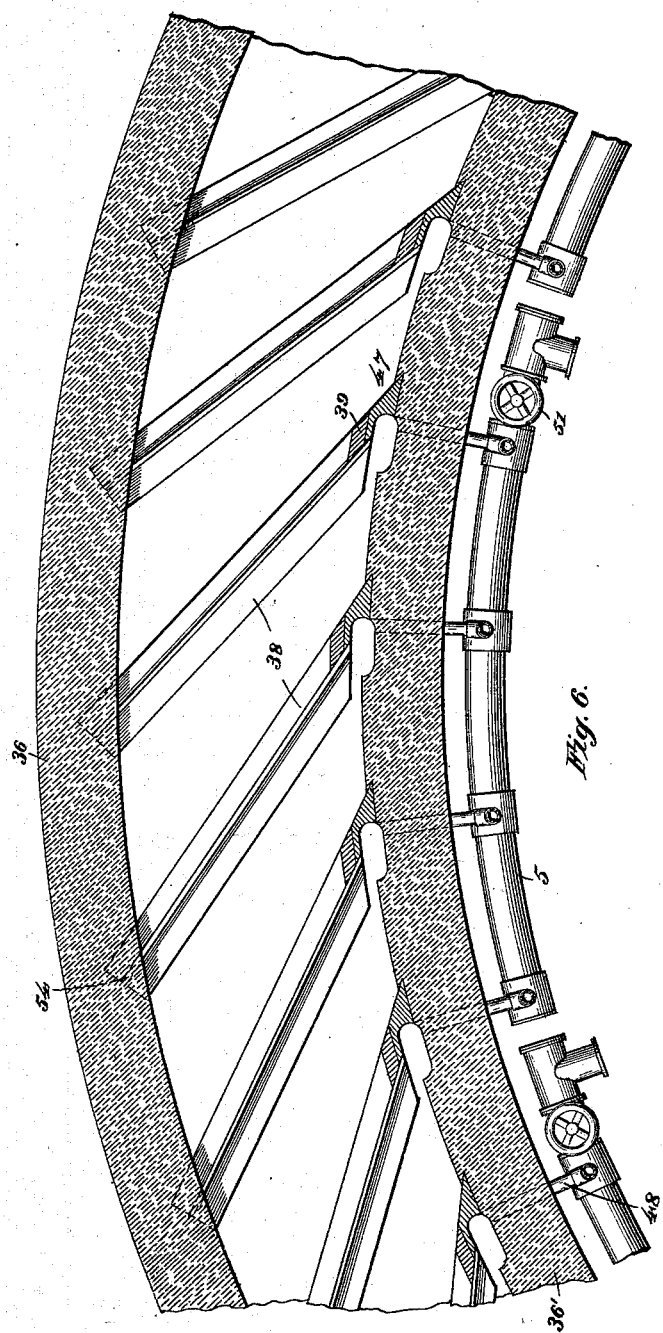

No. 714,793. Patented Dec. 2, 1902.
L. GATHMANN.
WATER PURIFYING APPARATUS.
(Application filed Mar. 7, 1901.)
(No Model.) 7 Sheets—Sheet 5.
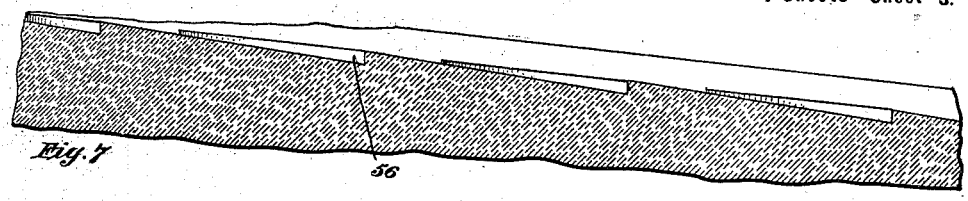
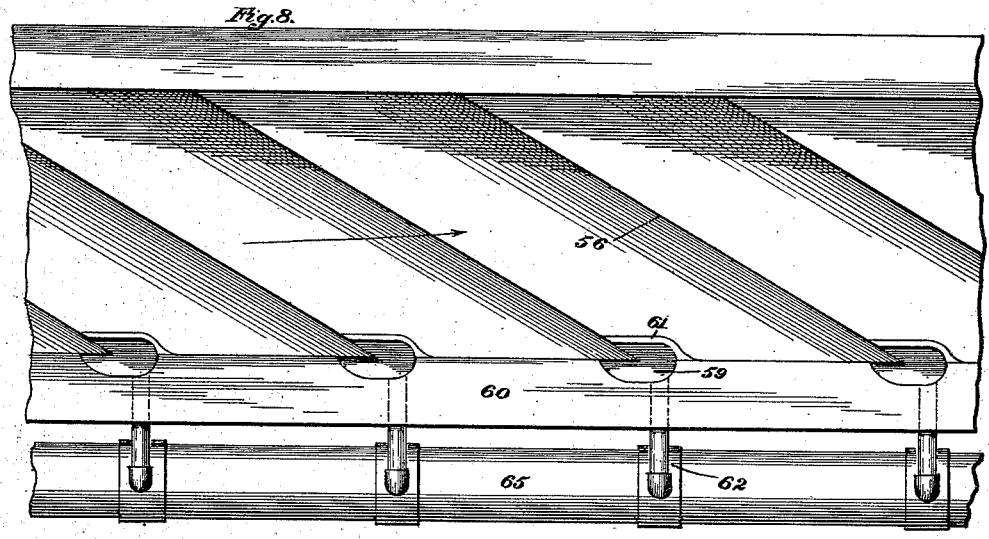
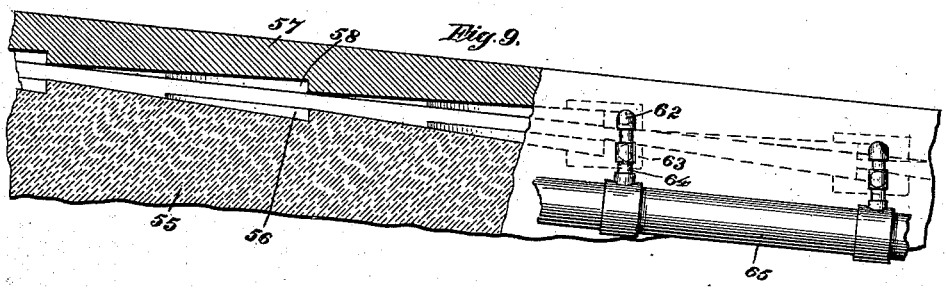
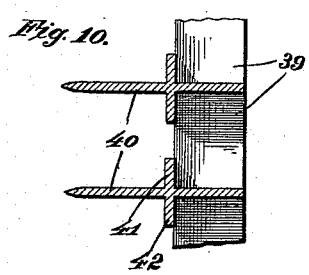

No. 714,793. Patented Dec. 2, 1902.
L. GATHMANN.
WATER PURIFYING APPARATUS.
(Application filed Mar. 7, 1901.)
(No Model.) 7 Sheets—Sheet 6.
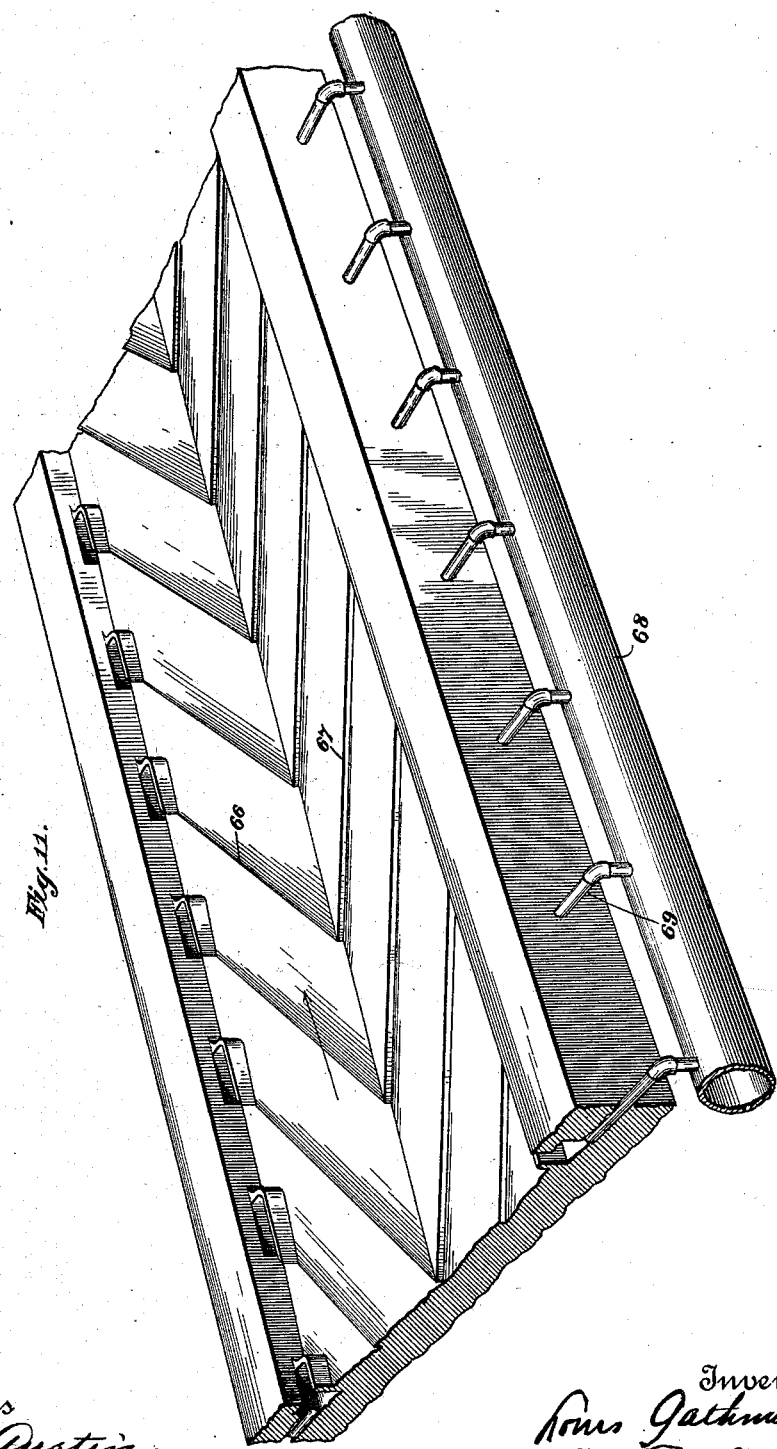

No. 714,793. Patented Dec. 2, 1902.
L. GATHMANN.
WATER PURIFYING APPARATUS.
(Application filed Mar. 7, 1901.)
(No Model.) 7 Sheets—Sheet 7.
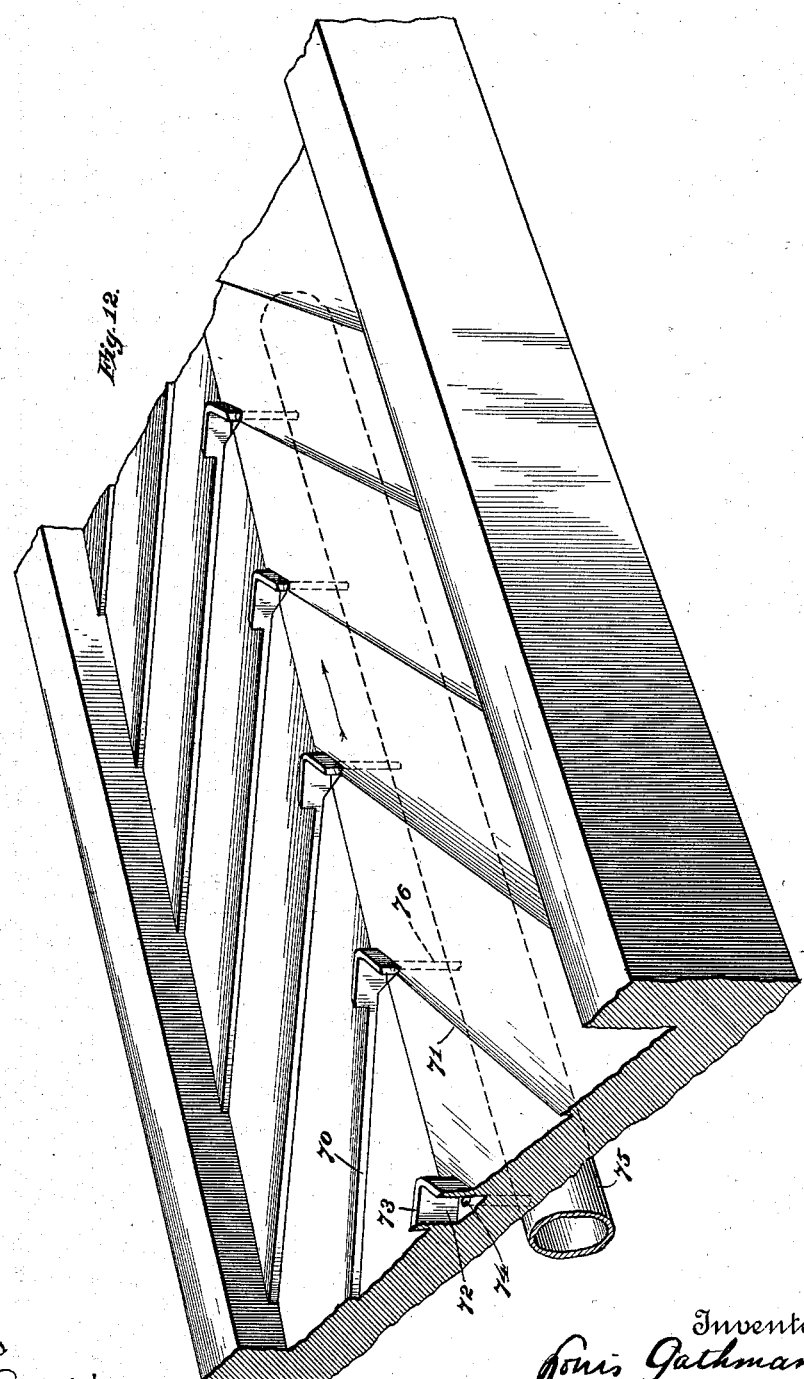

UNITED STATES PATENT OFFICE.

LOUIS GATHMANN, OF WASHINGTON, DISTRICT OF COLUMBIA.

WATER-PURIFYING APPARATUS.

SPECIFICATION forming part of Letters Patent No. 714,793, dated December 2, 1902.

Application filed March 7, 1901. Serial No. 50,264. (No model.)

*To all whom it may concern:*

Be it known that I, LOUIS GATHMANN, a resident of Washington, in the District of Columbia, have invented certain new and useful Improvements in Water-Purifying Apparatus, of which the following is a specification.

This invention relates to apparatus for purifying water, and refers more particularly to an apparatus wherein a stream of water is passed through a channel or passage provided with riffles or analogous obstructions serving to collect the sediment and to direct it to passages or recesses through which it is educted.

The object of the present invention is to provide a structure which is simple and inexpensive and which will operate to purify the stream of water passed therethrough continuously; to provide a construction which is not only simple and cheap, but is at the same time capable of embodiment which avoids the use of movable parts; to provide a construction which is well adapted for embodiment in both small and large apparatus—as, for example, for domestic purposes or for purifying the water for entire cities; to provide a construction in which the sediment collected continuously may be removed periodically at will and in a most convenient and effective manner; to provide a construction the several elements of which may be readily disassociated or taken apart for the purposes of inspection, repair, or the like; to provide a construction which is equally available for use where the water is passed therethrough under a substantial pressure or where it is passed through by gravity alone and the flow is only that due to a slight head; to provide a construction in which the water while passing through the apparatus is constantly agitated, and thus more effectively aerated and the oxidation of impurities more thoroughly carried out, and in general to provide improved details of construction contributing to the efficiency, durability, and economy of construction of the apparatus.

To the above ends the invention consists in the matters hereinafter described, and more particularly pointed out in the appended claims, and will be readily understood from the following description, reference being had to the accompanying drawings, in which—

Figure 2:
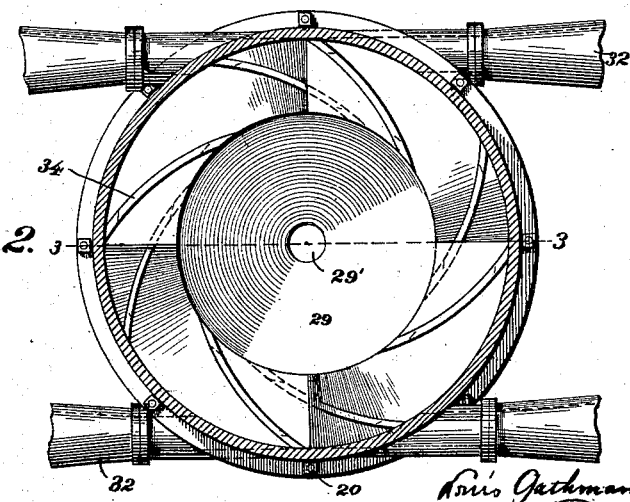

Figure 1 is a side elevation, with parts of the base shown in axial section, of the apparatus, embodying one preferred form of my invention. Fig. 2 is a horizontal sectional view taken in the plane just above the inlet-pipes, as indicated by dotted line 2 2 of Fig. 1, and looking downwardly. Fig. 3 is a vertical or axial sectional view taken on line 3 3 of Fig. 2. Fig. 3ª is an enlarged fragmentary sectional view taken transversely through two adjacent guide-flanges, showing the riffle members secured thereto in side elevation. Fig. 4 is a horizontal sectional view taken on line 4 4 of Fig. 5 and looking downwardly, showing a modified embodiment of the invention in which the water-purifying passages extend through a straight main. Fig. 5 is a side elevation of the apparatus shown in Fig. 4, a portion of the side wall being broken away to expose the internal arrangement of the several passages. Fig. 6 is a horizontal sectional view similar to Fig. 4, but showing the water-purifying passages as arranged within a curved main. Fig. 7 is a longitudinal sectional view of the lower member of the water-passage of the modified embodiment of the invention, which is desirably formed of concrete or analogous material, with the riffles thereof formed by the configuration of the surfaces. Fig. 8 is a top plan view of the member shown in Fig. 7. Fig. 9 is a view, partly in longitudinal vertical section and partly in side elevation, showing both the lower member shown in Figs. 7 and 8 and the superposed member which coöperates therewith. Fig. 10 is a transverse sectional detail of a pair of riffle members shown in the constructions of Figs. 4 to 6, both inclusive. Fig. 11 is a perspective view of the lower member of still another modification somewhat similar to that shown in Figs. 7 to 9, and Fig. 12 is a similar view of still another somewhat analogous construction.

Referring first to Figs. 1 and 2, wherein the invention is shown as embodied in a cylindrical vessel, 15 designates as a whole an upright cylindric chamber conveniently and as shown in the present instance constructed of three main members—namely, the upper and lower end members 16 17, respectively, and an intermediate member 18 conveniently made in the form of castings provided with union flanges 19 and bolted together by a plurality of through-bolts 20. Preferably and as shown in said figures the end walls 21 and 22 of the cylinder are made outwardly convex or conical, each end wall being provided at its center with an outlet-aperture with which are respectively connected eduction-pipes 23 24. At its upper end the chamber 15 is provided with one or more inlet-openings (two in the present instance) with which are connected inlet-pipes 25, which are tangential or substantially tangential to the cylindric side of the chamber, so as to impart an initial rotary or vortical action to the water as it is discharged into the chamber. Around the interior of a portion of the cylindric chamber—in the present instance that portion thereof which is formed by the central section 18—are arranged to extend a series of helically-disposed guide flanges or shelves 26, which divide the outer portions of the interior of the cylindric chamber into helical passages 26', extending from an open space 27, into which the inlet-pipes discharge, to a small space 28 at the opposite or lower end of the chamber. The radial width of these guide flanges or shelves 26 is considerably less than the internal radius of the chamber, so as to form a central well, within which are arranged a plurality of conical or funnel shaped partitions 29, arranged at intervals apart throughout the height of the said shelved portion of the chamber. It will be understood that the spiral passages formed between the guide-flanges are in open communication with the spaces between the series of conical partitions 29, so that when the apparatus is in use the entire interior of the same will be filled with a body of water. At their lower ends the spiral passages open or discharge into a lower annular chamber 28, which surrounds a central settling-chamber 30 and is divided therefrom by means of an annular vertical partition 31. With the chamber 28 communicate one or more eduction-pipes 32, which are provided and as shown in this instance are arranged tangentially, so as to facilitate the free escape of the water from said chamber. The progress of the water through the apparatus as thus constructed will be as follows: Entering the upper chamber 27 it will flow downwardly through the helical passages 26', and inasmuch as the conical partitions 29 practically separate the upper from the lower chambers of the apparatus the progressive flow of water will be entirely through the helical passages, those portions of the water which are within and above the several conical partitions having substantially no onward flow, but having a rapid vortical action, due to the influence of the water flowing through the helical passages and which are in communication with such spaces. The result of this action is to tend to concentrate the impurities axially of the several cones, and in order that the impurities thus collected may be continuously withdrawn from several cones the latter are provided with central discharge-apertures 29'. Such of the impurities as are of lesser specific gravity than the water will, owing to this vortical action, tend to rise through the central part of the chamber and are drawn off through the upper eduction-pipe 23, while the impurities which are of greater specific gravity than the water will pass downwardly through the several conical apertures to the settling-chamber 30 at the bottom of the apparatus. It will be understood that the lower eduction-pipe 24 will not remain open continuously, but will only be opened from time to time when it is necessary to flush out the collection of sediment.

I will next describe one of the most important features of the invention—namely, the means whereby advantage is taken of the tendency of impurities to lodge against obstructions over which or past which the water is flowing. This is effected by the provision of a series of riffles interposed in the passages, which are constructed and arranged in the present instance as follows: In carrying out this feature of the invention I provide elongated projections or riffles, which are arranged to extend transversely through passages through which the water flows, and it is to be understood that these riffle members may be either supported so as to extend freely within the body of water or that they may be supported against any one or more of the walls of the passage so long as they provide an obstruction around which the water will be deflected and against which the sediment will tend to lodge, and, further, an essential requisite is that these riffle members be arranged to extend transverely and obliquely with reference to the direction of the flow of water, so that the sediment and flocculent matter is not only arrested, but is also guided toward one end or the other of the riffle member, as will hereinafter more fully appear. Obviously these riffle members may take various forms, depending upon the manner in which they are supported, the character of the water-passage within which they are arranged, and the like; but in the construction shown in Figs. 1 to 3, inclusive, they are supported directly upon or between the guide flanges or shelves 26 and are as follows:

33 designates the several members of a series of riffle-plates, each consisting of a strip or bar of suitable length to extend spirally across the full width of the guide-flange, as best indicated in Fig. 2, and each, with the exception of the top one of each vertical series, provided at each end with a thickened space-block portion 34 of a thickness or vertical width equal to the space between adjacent turns of the guide-flanges. The main body portion of said riffle member is, however, of a thickness or vertical height equal to but a small proportion of the vertical depth of the passage—say, for example, one-fourth of the latter—and the rear face or edge 35 of the body portion thereof considered with reference to the direction of flow of the water is preferably perpendicular to the passage, or substantially so, so that a face is provided against which the impurities tend to collect. By reason of the tendency of the floating impurities to lodge in eddies or relatively quiet portions of the water and also to lodge upon obstructions projecting into the stream these riffle members serve to each successively arrest some portion of the impurities with which the water is charged. By reason, further, of the inclination of the riffle members to the direction of flow of the water there is a continuous flow of the partially-arrested water and impurities in the angle in rear of the riffle toward the most advanced end of the riffle or in the direction of least resistance, which serves to prevent the impurities from lodging immovably against the riffle, but instead serves to guide them toward the said advanced end of the riffle member. It will be obvious that the tendency of impurities to cohere or adhere will facilitate this action, and especially in the case of those impurities which are of a somewhat fibrous or stringy nature and which therefore tend to lodge across the projecting edges of the riffle members. It will be further obvious that although any given particle or mass of impurity may not and probably will not be caught by any one riffle, so as to be carried throughout the full length of the latter and discharged at the end thereof, yet each successive riffle will tend to carry the impurity farther and farther toward the center of the apparatus, (the advanced ends of the riffle members being in the present instance located at the inner edges of the surface or guide-flanges,) so that finally the impurities will be discharged laterally out of the main stream of water passing through the passages and into the bodies of water contained in the conical members, as hereinbefore described.

It is to be understood that the riffle members are effective not only to arrest those impurities which are of greater specific gravity than the water and which tend to collect at the bottom of the stream, but also to arrest those impurities which are of less specific gravity than the water and which therefore tend to rise to the upper parts of the stream. For this reason in the construction shown the riffle-plates are arranged to project from the upper wall of the passage downwardly and from the lower wall of the passage upwardly, and for convenience of construction these series of alternate upper and lower riffles are arranged vertically above each other, although it will be obvious that the precise arrangement is not essential. When arranged as shown and described in the present instance, the riffle members with their thickened end portions form convenient supports for holding the guide flanges or shelves suitably spaced apart and in position within the apparatus.

It will be obvious from the description of the riffle members heretofore given that their operation does not depend upon any peculiarity of the form or arrangement of the water-passage in itself, and I have therefore shown several modifications showing different applications of the same to differently-constructed apparatus.

Referring to the construction shown in Figs. 4 and 5, 36 36' designate the side walls of a conduit or water-main, and 37 the bottom wall thereof, these three sides being conveniently constructed of concrete or other suitable masonry. 38 designates as an entirety riffle members arranged to extend obliquely across said conduit, said riffle members being in the present instance, and conveniently, arranged in vertical series one above another throughout the full height or depth of the conduit and held spaced apart by means of space-blocks 39, interposed between the end portions of the riffle members themselves. In the instance shown said riffle members 38 consist each of a horizontal plate portion or main body 40 and upwardly and downwardly projecting riffle-flanges 41 42, respectively, which are located at points intermediate of the width of the plates. The space-blocks 39 rest within the angles formed between the front sides of the flanges 41 42 and the riffle-plate. The inner surface of the side wall 36 is provided with a series of projections or vertical ribs 43, one for each series of riffle members, and the space-blocks 39, which serve to hold the riffle members separate at this side of the conduit, are provided with corresponding recesses 44, adapted to receive said projections, so as to hold the riffle members from movement longitudinally of the conduit, while leaving them free to be lifted up vertically. The opposite side wall 36' is provided with a series of vertically-disposed supporting-bars 45, one for each series of riffles, these bars being conveniently seated and anchored within the side wall, as indicated clearly in the sectional view Fig. 4, and being provided at their inner edges with rearwardly-projecting flanges 46, inside of which are formed pockets or recesses 47, which extend vertically throughout the full height of the several series of riffles. Preferably and as shown herein the size of said recesses or pockets 47 is increased by recessing the inner surface of the wall somewhat at points opposite the flanges 46. The riffle members are engaged with the supporting-bar 45 by having their extreme end portions arranged to extend beyond the space-blocks 39 sufficiently to engage the rear edges of the flanges 46, while the said space-blocks are rigidly secured to the several riffle members and rest in engagement with the approximate surfaces of the flanges 46, and thus serve to hold the riffle members against endwise movement. It will be observed that the construction at this end of the riffle member also permits the latter to be lifted up vertically. The pockets 47 form collecting passages or chambers, into which the sediment and impurities are guided and discharged from the several riffle members, and it is to be understood that the impurities may be withdrawn from these settling-pockets continuously by means of suitable outlets, but preferably will be withdrawn at intervals whenever a sufficient accumulation has accrued to render this necessary. Any suitable means may be employed for thus removing the collected impurities from the passages or pockets 47 either automatic or operable at will by hand or by suitable motors. In the construction shown in said Figs. 4 and 5 I have provided a series of outlet-pipes 48, communicating with each settling recess or pocket 47 at intervals throughout the height of the latter through the side wall 36', the outer ends of each vertical series connecting with the riser 49, which in turn communicates at its lower end with the trunk or main 50. Preferably the main 50 will be divided into sections in cases where the purifying-conduit be of extended length in order that these sections near the receiving end of the conduit, wherein the riffle members will obviously collect greater quantities of impurities, may be more frequently opened to withdraw the accumulation. Each section of main 50 will be provided with a suitable controlling-valve 51 and discharge-pipe 52. The lowermost series of riffles may be and is shown in the present instance as formed in the surface of the bottom wall of the conduit, consisting simply of upstanding steps or vertical riffle-faces 53, formed in the masonry itself and extending obliquely across the bottom parallel with the corresponding series of riffle members. The operation of this apparatus will be entirely obvious from the foregoing description, taken in connection with the description of the operation of the first-described apparatus, and need not, therefore, be set forth in detail herein. It will, however, be understood that the direction of flow of the water is in the direction of the arrow indicated on Fig. 4.

In Fig. 6 I have shown a modification which is substantially like the construction shown in Figs. 4 and 5, with the exception that the conduit or main is in this instance curved, and the outer ends of the riffle members are seated within recesses 54, formed within the outer side wall 36 instead of being held by projections, as in the previous instance. The construction of the apparatus is otherwise the same.

In Figs. 7, 8, and 9 I have shown still another modification in which a single relatively shallow and wide conduit or water-passage is provided with riffles formed in the upper and lower inner surfaces of the walls of the conduit, this construction enabling me to dispense with riffle members as independent elements of construction. In this instance 55 designates the bottom wall of the conduit, which may conveniently be of concrete or masonry provided with riffle-steps 56, constructed and arranged substantially as are the riffle-steps 53 of the construction shown in Fig. 5. 57 designates the top wall or cover of the conduit, which is provided upon its inner face with corresponding riffle projections 58, arranged opposite and parallel with the riffle projections 56. At the advanced ends of the riffle projections considered with reference to the direction of flow of the water are formed pockets or collecting-chambers 59, substantially like the chambers 47, hereinbefore described in connection with Fig. 4, these recesses being formed in part within the side wall 60 of the conduit and in part by vertical flange-bars 61. In this instance also each pocket is provided with a pair of outlet-pipes, as 62 63, one connected with the upper portion of the pocket and one with the lower portion thereof and each in turn communicating with a stand-pipe 64, which discharges into a main 65.

In Fig. 11 I have shown a construction which is substantially like that just described in Figs. 7, 8, and 9, with the exception that each riffle projection consists of two portions 66 67, arranged at opposite inclinations at opposite sides of the median line of the conduit. A construction of this kind is particularly suitable where it is desired to employ very wide conduits and of comparative small depth, such a construction of the riffles tending to equalize and distribute the flow of the liquid over the entire bottom of the conduit and being also somewhat more effective in collecting the impurities, since the latter need only travel one-half the width of the conduit before reaching the settling pockets or recesses. Obviously with a construction of this kind it is necessary to provide discharge-mains, as 68, at each side, (one only being shown in the drawings,) which mains communicate with the several settling-pockets through pipes 69, as in the other constructions described.

In Fig. 12 I have shown still another modification, which is in one respect very similar to that last described—namely, in its adaptability for relatively wide conduits. In this instance, however, the riffles, while of two-part construction, as indicated by 70 and 71, and arranged at opposite angles of inclination, are so disposed as to direct the collected impurities to the center of the conduit instead of toward the sides thereof. At the meeting points of each pair of riffles is provided a V-shaped settling-recess 72, in the present instance formed in part by a depression in the floor of the conduit and in part by an upstanding flange or partition 73, which rises to the upper wall of the conduit. With the bottom of each recess or chamber 72 communicates a discharge-outlet 74, which communicates with a main 75 by means of suitable pipe-sections 76. (Indicated in dotted lines in the drawings.) The operation of this construction will be entirely obvious and need not, therefore, be described, it being understood that the flow of water through the conduit will be in the direction of the arrow shown on Fig. 12, as in the previously-described instance.

From the foregoing description it will be seen that I attain the several objects of my invention and provide an apparatus which may be very economically constructed, may be adapted to almost any capacity or peculiarity of situation, and which will be highly effective in rapidly purifying the water by a continuous or uninterrupted method. It will be further obvious that the details of construction may be widely modified without departing from the spirit of the invention, and I do not, therefore, wish to be limited to the details of construction described herein except to the extent that the same are made the subject of specific claims.

I claim as my invention—

1. In a water-purifying apparatus, a water-passage, a riffle arranged transversely of and upon one of the walls of said passage and obliquely with reference to the direction of flow of the water, and an eduction-passage into which the impurities collected by said riffle are discharged.

2. In a water-purifying apparatus, a water-passage, a riffle arranged transversely in said passage, and obliquely with reference to the flow of the water therethrough and a settling-recess at the end of the riffle into which the impurities collected by said riffle are discharged.

3. In a water-purifying apparatus, a water-passage, a riffle arranged transversely in said passage, and obliquely with reference to the direction of the flow of the water therethrough, a recess at the end of the riffle into which the impurities collected by said riffle are discharged, and means for discharging the impurities from the recess periodically.

4. In a water-purifying apparatus, a water-passage, and a plurality of riffles arranged transversely in said passage and obliquely with reference to the direction of flow of the water, part of said riffles projecting downwardly from the upper walls of said conduit, and part projecting upwardly from the lower walls thereof, and a recess or recesses into which the impurities collected by said riffles are discharged.

5. In a water-purifying apparatus, a water-passage, a riffle member arranged to extend through said passage, obliquely with reference to the direction of flow of the water therethrough, and provided with upper and lower riffle projections, and an intermediate current-dividing plate portion whereby the current of water is deflected around said riffle member upon both sides thereof, and a collecting-pocket at one end of said riffle member into which the impurities collected thereby are discharged.

6. In a water-purifying apparatus, a curved water-passage and a plurality of riffles arranged transversely in said passage and obliquely with reference to the direction of flow of the water.

7. In a water-purifying apparatus, a curved water passage or conduit, a series of riffle members arranged therein to extend transversely thereof and obliquely with reference to the length of the conduit, the advanced ends of said riffle members being located at that side of the conduit toward the center of the circle or curvature of the conduit, and one or more settling-chambers located contiguous to the said advanced ends of the riffle members and into which the latter discharge.

8. In a water-purifying apparatus, a curved water passage or conduit, a series of riffle members arranged therein to extend transversely thereof and obliquely with reference to the length of the conduit, the advanced ends of said riffle members being located at that side of the conduit toward the center of the circle or curvature of the conduit, and one or more settling-chambers located contiguous to the said advanced ends of the riffle members and into which the latter discharge, and means for forcing water through said passage under pressure, whereby the vortical action of the current aids in discharging the impurities arrested by the riffles.

9. In a water-purifying apparatus, the combination of a closed chamber having side walls concentric to the vertical axis and a helically-disposed guide-flange arranged around the interior of said chamber, a series of riffles arranged to extend transversely of the passages formed between contiguous portions of said helical guide-flange, and means for discharging the impurities gathered by said riffles from the main body of water passing through the apparatus.

10. In a water-purifying apparatus, the combination of a closed chamber having circular side walls, the eduction-passages communicating with the central portions of the ends thereof, a helically-disposed guide-flange arranged to extend around the circular side walls of said chamber, a series of riffles supported upon said guide-flange to extend transversely thereof and obliquely forwardly and inwardly with reference to the direction of flow of water between passages formed by said guide-flange, and a conical partition separating the space circumscribed by the inner margin of said guide-flange, and provided with a central aperture as and for the purpose set forth.

11. In a water-purifying apparatus, the combination of a closed chamber, having circular side walls, the eduction-passages communicating with the central portions of the ends thereof, a helically-disposed guide-flange arranged to extend around the circular side walls of said chamber, a series of riffles supported upon said guide-flange to extend transversely thereof, and obliquely forwardly and inwardly with reference to the direction of flow of water between passages formed by said guide-flange, and a plurality of conical partitions separating spaces circumscribed by the inner margin of said guide-flange, and each provided with an aperture as and for the purpose set forth.

12. In a water-purifying apparatus, the combination of a closed chamber having side walls concentric to the vertical axis, upper and lower eduction-passages communicating with the central end portions of said chamber, and a helically-disposed guide-flange arranged to extend around the interior of the side walls of said chamber, a series of riffles arranged to extend transversely of said guide-flange, a plurality of conical partitions separating the space between and circumscribed by the inner margins of said guide-flange, each provided with a central aperture, a central settling-chamber located below the lowermost of said conical partitions, an annular outlet-chamber surrounding said settling-chamber, into which the body of water passing through the passages formed between said guide-flanges is discharged, one or more inlet-pipes communicating with the upper part of said chamber, and discharging tangentially therein, and an outlet from the said annular chamber, substantially as described.

LOUIS GATHMANN.

Witnesses:
ALBERT H. GRAVES,
L. S. BACON.